United States Patent
Guha (10) Patent No.: US 7,373,559 B2
(45) Date of Patent: May 13, 2008

(54) METHOD AND SYSTEM FOR PROACTIVE DRIVE REPLACEMENT FOR HIGH AVAILABILITY STORAGE SYSTEMS

(75) Inventor: Aloke Guha, Louisville, CO (US)

(73) Assignee: Copan Systems, Inc., Longmont, CO (US)

( * ) Notice: Subject to any disclaimer, the term of this patent is extended or adjusted under 35 U.S.C. 154(b) by 312 days.

(21) Appl. No.: 10/937,226

(22) Filed: Sep. 8, 2004

(65) Prior Publication Data

US 2005/0060618 A1    Mar. 17, 2005

Related U.S. Application Data

(60) Provisional application No. 60/501,849, filed on Sep. 11, 2003.

(51) Int. Cl.
*G06F 11/00* (2006.01)

(52) U.S. Cl. .......................................... 714/54

(58) Field of Classification Search ............... 360/61; 714/54, 47

See application file for complete search history.

(56) References Cited

U.S. PATENT DOCUMENTS

| | | | |
|---|---|---|---|
| 4,467,421 A | | 8/1984 | White |
| 5,088,081 A | | 2/1992 | Farr |
| 5,371,882 A | * | 12/1994 | Ludlam .................... 714/7 |
| 5,410,439 A | * | 4/1995 | Egbert et al. ............. 360/75 |
| 5,438,674 A | | 8/1995 | Keele et al. |
| 5,530,658 A | | 6/1996 | Hafner et al. |
| 5,539,592 A | * | 7/1996 | Banks et al. ............... 360/75 |
| 5,557,183 A | * | 9/1996 | Bates et al. ............... 318/434 |
| 5,612,845 A | * | 3/1997 | Smith .......................... 360/137 |
| 5,666,538 A | | 9/1997 | DeNicola |
| 5,680,579 A | | 10/1997 | Young et al. |
| 5,720,025 A | * | 2/1998 | Wilkes et al. ............... 714/6 |
| 5,787,462 A | | 7/1998 | Hafner et al. |
| 5,805,864 A | | 9/1998 | Carlson et al. |
| 5,828,583 A | * | 10/1998 | Bush et al. ............... 702/185 |
| 5,913,927 A | * | 6/1999 | Nagaraj et al. .............. 714/8 |
| 5,917,724 A | * | 6/1999 | Brousseau et al. .......... 700/81 |
| 5,923,876 A | * | 7/1999 | Teague ...................... 719/321 |
| 5,935,261 A | * | 8/1999 | Blachek et al. ............ 714/42 |
| 5,961,613 A | | 10/1999 | DeNicola |
| 6,078,455 A | * | 6/2000 | Enarson et al. ............ 360/68 |
| 6,128,698 A | | 10/2000 | Georgis |
| 6,467,054 B1 | * | 10/2002 | Lenny ......................... 714/42 |

(Continued)

OTHER PUBLICATIONS

IDEMA Standard Document No. R2-98 pp. 1-21.*

(Continued)

*Primary Examiner*—Robert Beausoliel
*Assistant Examiner*—Amine Riad
(74) *Attorney, Agent, or Firm*—Charles J. Kulas; Brian N. Young; Trellis I.P. Law Group, PC (57) ABSTRACT

Methods for preventing the failure of disk drives in storage systems are disclosed. A system and a computer program product for preventing the failure are also disclosed. Factors relating to the aging or early onset of errors in a disk drive are monitored. These factors are then compared to thresholds. In case the thresholds are exceeded, an indication for the replacement of the disk drive is given. Sudden rises in the factors are also used to indicate the impeding failure of disk drives.

22 Claims, 6 Drawing Sheets

U.S. PATENT DOCUMENTS

| | | | |
|---|---|---|---|
| 6,600,614 B2* | 7/2003 | Lenny et al. | 360/31 |
| 6,680,806 B2* | 1/2004 | Smith | 360/31 |
| 6,859,882 B2* | 2/2005 | Fung | 713/300 |
| 6,928,556 B2* | 8/2005 | Black et al. | 726/6 |
| 6,957,291 B2 | 10/2005 | Moon et al. | |
| 6,982,842 B2* | 1/2006 | Jing et al. | 360/31 |
| 6,986,075 B2* | 1/2006 | Ackaret et al. | 714/4 |
| 7,035,972 B2 | 4/2006 | Guha et al. | |
| 7,107,491 B2* | 9/2006 | Graichen et al. | 714/37 |
| 7,210,004 B2 | 4/2007 | Guha et al. | |
| 2002/0007464 A1 | 1/2002 | Fung | |
| 2002/0062454 A1 | 5/2002 | Fung | |
| 2002/0144057 A1 | 10/2002 | Li et al. | |
| 2003/0112538 A1* | 6/2003 | Smith | 360/31 |
| 2003/0196126 A1 | 10/2003 | Fung | |
| 2003/0200473 A1 | 10/2003 | Fung | |
| 2003/0216888 A1* | 11/2003 | Ridolfo | 702/181 |
| 2004/0006702 A1 | 1/2004 | Johnson | |
| 2004/0051988 A1* | 3/2004 | Jing et al. | 360/31 |
| 2004/0111251 A1 | 6/2004 | Trimmer et al. | |
| 2004/0153614 A1 | 8/2004 | Bitner et al. | |
| 2005/0177755 A1 | 8/2005 | Fung | |
| 2005/0210304 A1 | 9/2005 | Hartung | |
| 2006/0053338 A1 | 3/2006 | Cousins | |
| 2007/0079170 A1* | 4/2007 | Zimmer et al. | 714/6 |

OTHER PUBLICATIONS

Adam Weikal, Bruce Peterson, David L. Smith; *Maxtor SMART/DST User's Guide*; Revision C; May 1, 2002; © Maxtor Corporation 2001; pp. 1-52.

*S.M.A.R.T. Design, Desktop HDD Development IDE, HDD Development, Storage M& D*; Jul. 12, 2002; © 2001 IMB Corp.: pp. 1-19.

Jim Herbst; *SMART Specification For Seagate Technology Desktop and Mobile Drives*; Version 2.28; Apr. 23, 2003; pp. 1-36.

*Reliability of Hard Disk Drives (HDD)*; © 2003 by CALCE and the University of Maryland; p. 1-2.

Asaca/Shibasoku Corp of America, publication DM200, 1 page from www.asaca.com/DVL/DM_200.htm, Oct. 7, 2003.

Colarelli et al., The Cas for Massive Arrays of Idle Disks (MAID), Dept of Computer Science, Univ. of Colorado, Boulder, pp. 1-6, Jan. 7, 2002.

Patterson et al., "A Case for Redundant Arrays of Inexpensive Disks (RAID)," ACM, pp. 109-116, 1998.

Chase et al., "Managing Energy and Server Resources in Hosting Centers," Dept of Computer Science, Duke University, pp. 14, Oct. 2001.

* cited by examiner

METHOD AND SYSTEM FOR PROACTIVE DRIVE REPLACEMENT FOR HIGH AVAILABILITY STORAGE SYSTEMS

CLAIM OF PRIORITY

This application claims priority to the following application, hereby incorporated by reference as if set forth in full in this application:

U.S. Provisional Patent Application Ser. No. 60/501,849 entitled 'Method for Proactive Drive Replacement for High Availability RAID Storage Systems', filed on Sep. 11, 2003

RELATED APPLICATIONS

This application is related to the following application which is hereby incorporated by reference as if set forth in full in this specification:

Co-pending U.S. patent application Ser. No. 10/607,932, entitled 'Method and Apparatus for Power Efficient High-Capacity Storage System', filed on Sep. 12, 2002.

BACKGROUND

The present invention relates generally to digital processing systems. More specifically, the present invention relates to a method of prevention of failures of disk drives in high availability storage systems.

Typically, in computing applications, data storage systems include storage devices such as hard disk drives, floppy drives, tape drives, compact disks, and the like. An increase in the amount and complexity of these applications has resulted in a proportional increase in the demand for larger storage capacities. Consequently, the production of high capacity storage devices has increased in the past few years. However, large storage capacities demand reliable storage devices with reasonably high data transfer rates. Moreover, the storage capacity of a single storage device cannot be increased beyond a certain limit. Hence, various data storage system configurations and topologies using multiple storage devices are commonly used to meet the growing demand for increased storage capacity.

A configuration of the data storage system to meet the growing demand involves the use of multiple small disk drives. Such a configuration permits redundancy of stored data. Redundancy ensures data integrity in case of device failures. In many such data storage systems, recovery from common failures can be automated within the data storage system itself using data redundancy, such as parity, and its generation with the help of a central controller. However, such data redundancy schemes may be an overhead to the data storage system. These data storage systems are typically referred to as Redundant Array of Inexpensive/Independent Disks (RAID). The 1988 publication by David A. Patterson, et al., from University of California at Berkeley, titled 'A Case for Redundant Arrays of Inexpensive Disks (RAID)', describes the fundamental concepts of the RAID technology.

RAID storage systems suffer from inherent drawbacks that reduce their availability. In case one disk drive in the RAID storage system fails, data can be reconstructed with the help of redundant drives. The reconstructed data is then stored in a replacement disk drive. During reconstruction, the data on the failed drive is unavailable. Further, if more than one disk drive fails, data on both drives cannot be reconstructed if there is single drive redundancy, typical of most RAID storage systems. The probability of failure increases as the number of disk drives in a RAID storage system increases. Therefore, RAID storage systems with large numbers of disk drives are typically organized into several smaller RAID systems. This reduces the probability of failure of large RAID systems. Further, the use of smaller RAID systems also reduces the time it takes to reconstruct data on a spare disk drive in the event of a disk drive failure. When a RAID system loses a critical number of disk drives, there is a period of vulnerability from the time the disk drives fail until the time data reconstruction on the spare drives completes. During this time interval, the RAID system is exposed to the possibility of additional disk drives failing which would cause a catastrophic failure. A catastrophic failure of a RAID system results in unrecoverable data loss. If the failure of a one or more disk drives can be predicted with sufficient time to replace the drive or drives before a failure or failures, and a drive or drives can be replaced without sacrificing fault tolerance, the data reliability and availability can be considerably enhanced.

There exist a number of methods for predicting impending failure of disk drives in storage systems. One such method is described in U.S. Pat. No. 5,727,144, titled 'Failure Prediction for Disk Arrays', assigned to International Business Machines Corporation, NY, and filed on Jul. 12, 1996. In this method, failure is predicted with the help of error analysis. This includes flyheight analysis and error log analysis. In flyheight analysis, the failure is predicted if the flyheight of the read/write head above the disk head is too low. In error log analysis, seek error rates, sector reassign rates, and the like, are compared with thresholds. If these factors exceed the thresholds, then failure is predicted. Data of the disk drive, for which the monitored factors have exceeded the thresholds, is copied onto a spare disk drive before the failure occurs. Further, if the disk drive fails before the data is completely copied, the contents of the failed disk drive are rebuilt.

Storageflex RAID systems, manufactured by Storageflex, Ontario, Canada predict failure of disk drives with the help of Self-Monitoring, Analysis, and Reporting Technology (SMART) attributes. SMART is an interface between a disk drive and a drive controller. The drive controller receives information from disk drives, through the SMART interface, in the form of attributes. SMART attributes that are monitored in Storageflex RAID systems include head flying height, data throughput performance, spin-up time, reallocated sector count, seek error rate, seek time performance, spin try recount and drive calibration retry count.

However, the methods and systems described above suffer from one or more of the following shortcomings. Disk drive manufacturers recommend some key factors for predicting disk drive failure. The manufacturers also recommend thresholds, which the factors should not exceed. The systems described above do not consider these factors. Further, the systems do not consider the sudden rise of these factors for predicting failure of disk drives.

SUMMARY

In accordance with one embodiment of the present invention, factors relating to the aging of disk drives are monitored. These factors are compared with thresholds. In case the thresholds are exceeded, an indication for the replacement of the disk drive is given. In accordance with another aspect of the present invention, the indication is given when factors relating to the early onset of errors in the disk drives are compared with thresholds. In accordance with another embodiment of the present invention, the indication is given when a factor shows a sudden increase.

In another embodiment of the invention, a system for preventing disk drive failures in a storage system is provided. The apparatus includes a command router that retrieves factors relating to the failure to a particular disk drive in the plurality of disk drives. The apparatus also includes a processor for monitoring the factors and a memory for storing a set of thresholds to which the factors are compared. If any of the factors for a particular disk drive exceeds the threshold, the apparatus indicates that the disk drive needs to be replaced.

In accordance with an embodiment of the invention, the method for prevention of failure of disk drives uses factors such as reallocated sector count (RSC), read error rate (RSE), seek error rate (SKE), spin retry count (SRC), and the like. These factors can easily be obtained from disk drives through the Self-Monitoring, Analysis, and Reporting Technology (SMART) interface, which is a part of most currently available disk drives. Factors from environmental sensors can also be used to predict the failure of disk drives.

BRIEF DESCRIPTION OF THE DRAWINGS

Various embodiments of the invention will hereinafter be described in conjunction with the appended drawings provided to illustrate and not to limit the invention, wherein like designations denote like elements, and in which.

DESCRIPTION OF VARIOUS EMBODIMENTS

Embodiments of the present invention provide a method, system and computer program product for preventing the failure of disk drives in high availability storage systems. Failure of disk drives is predicted and an indication for their replacement is given. Failure is predicted by the monitoring of factors, including those relating to the aging of disk drives, early onset of errors in disk drives and the acceleration of these factors.

Figure 1:
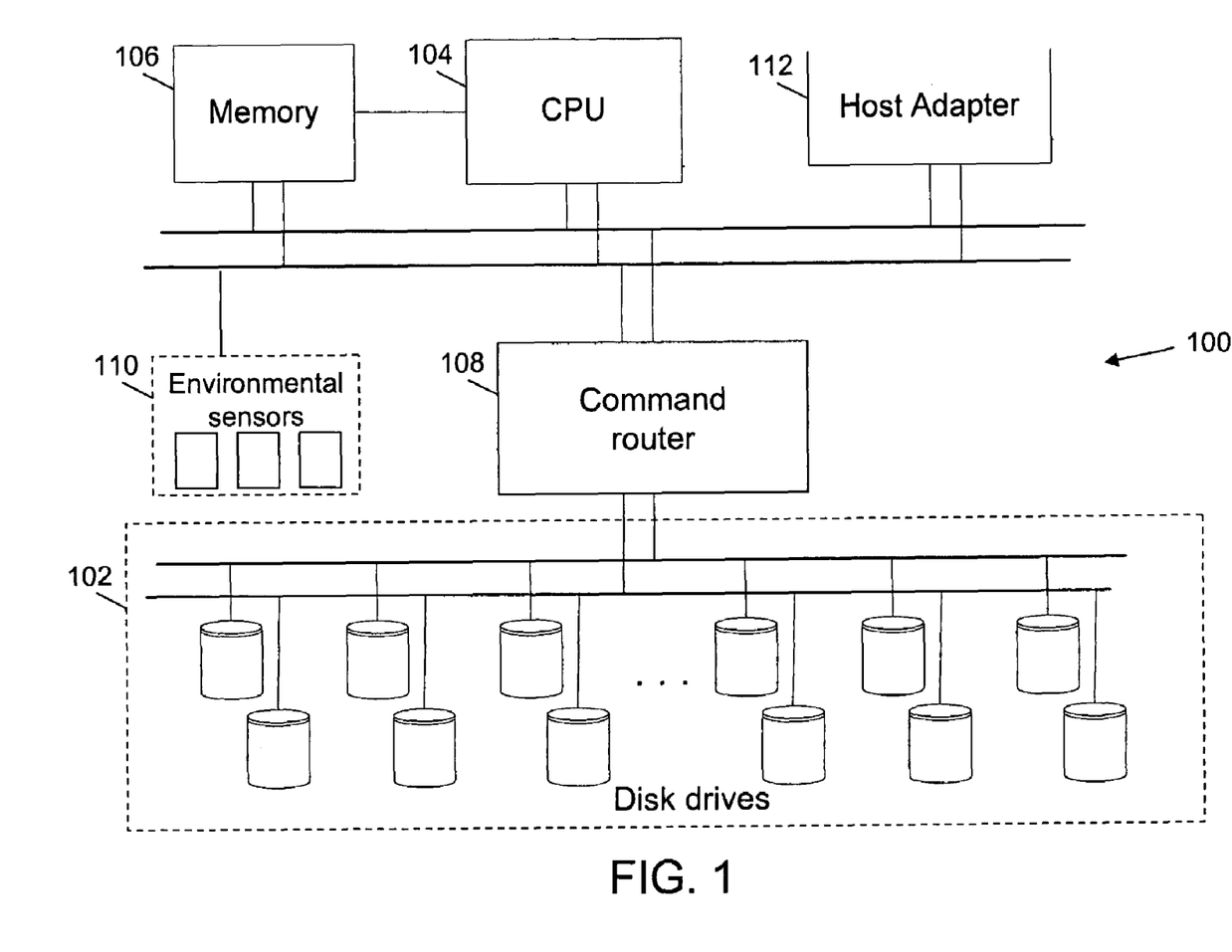
FIG. 1 is a block diagram illustrating a storage system, in accordance with an embodiment of the present invention.

FIG. 1 is a block diagram illustrating a storage system 100 in accordance with an embodiment of the invention. Storage system 100 includes disk drives 102, a Central Processing Unit (CPU) 104, a memory 106, a command router 108, environmental sensors 110 and a host adaptor 112. Storage system 100 stores data in disk drives 102. Further, disk drives 102 store parity information that is used to reconstruct data in case of disk drive failure. CPU 104 controls storage system 100. Among other operations, CPU 104 calculates parity for data stored in disk drives 102. Further, CPU 104 monitors factors of each disk drive in disk drives 102 for predicting failure.

Exemplary factors for predicting disk drive failures include power-on hours, start stops, reallocated sector count, and the like. The method of predicting disk drive failure by monitoring the various factors is explained in detail in conjunction with FIG. 3, FIG. 5 and FIG. 6. Memory 106 stores the monitored values of factors. Further, memory 106 also stores values of thresholds to which the factors are compared. In an embodiment of the invention, Random Access Memory (RAM) is used to store the monitored values of factors and the threshold values. Command router 108 is an interface between CPU 104 and disk drives 102. Data to be stored in disk drives 102 is sent by CPU 104 through command router 108. Further, CPU 104 obtains values of factors for predicting disk drive failure through command router 108. Environmental sensors 110 measure environmental factors relating to the failure of disk drives 102. Examples of environmental factors that are measured by environmental sensors 110 include temperature of disk drives, speed of cooling fans of storage system 100, and vibrations in storage system 100. Host adaptor 112 is an interface between storage system 100 and all computers wanting to store data in storage system 100. Host adaptor 112 receives data from the computers. Host adaptor 112 then sends the data to CPU 104, which calculates parity for the data and decides where the data is stored in disk drives 102.

Figure 2:
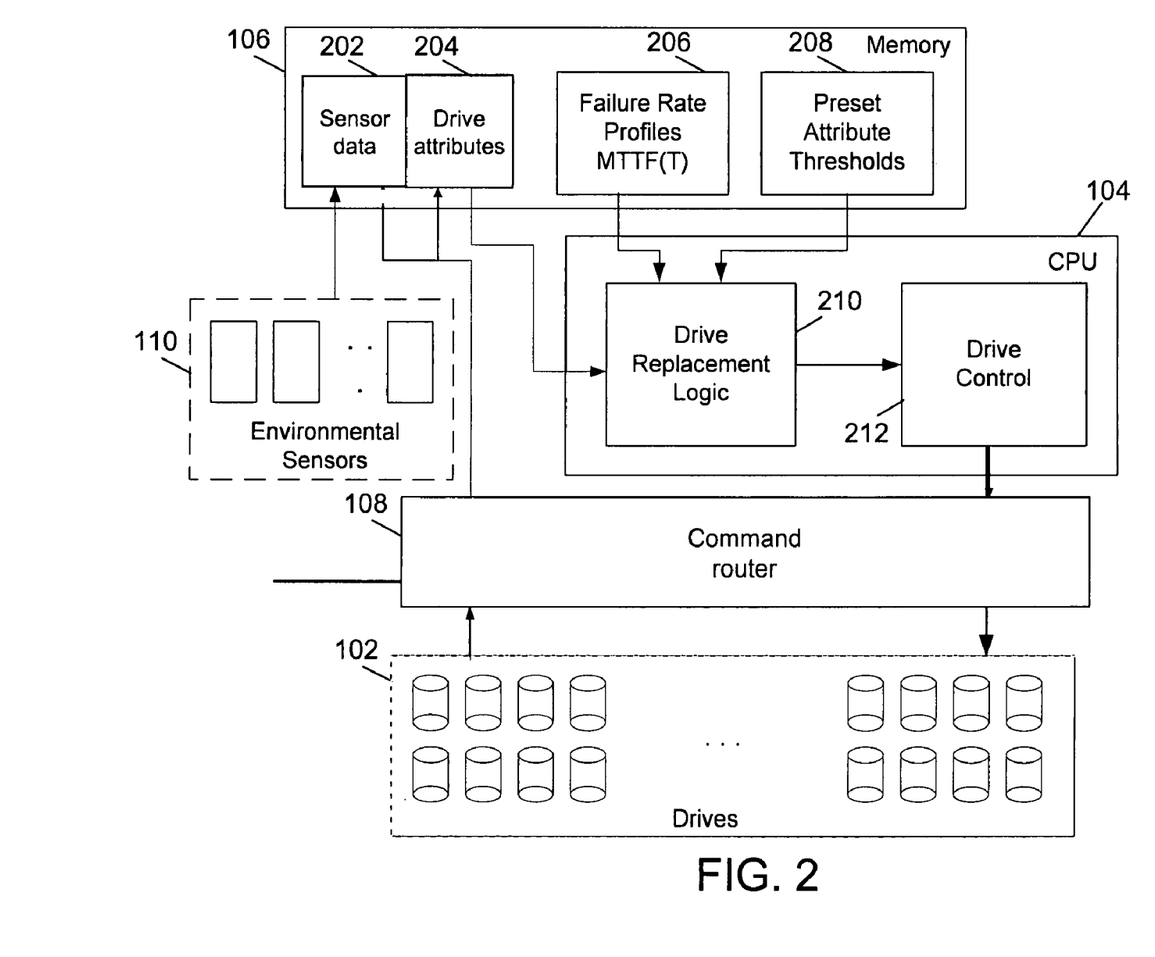
FIG. 2 is a block diagram illustrating the components of a memory and a Central Processing Unit (CPU) and their interaction in accordance with an embodiment of the present invention.

FIG. 2 is a block diagram illustrating the components of memory 106 and CPU 104 and their interaction, in accordance with an embodiment of the invention. Memory 106 stores sensor data 202 obtained from environmental sensors 110, drive attributes 204 obtained from each of disk drives 102, failure rate profiles 206, and preset attribute thresholds 208. In order to predict failure of each disk drive in disk drives 102, sensor data 202 and drive attributes 204 are compared with failure rate profiles 206, and preset attribute thresholds 208. This prediction is described later in conjunction with FIG. 3, FIG. 5 and FIG. 6. CPU 104 includes drive replacement logic 210 and drive control 212. The comparison in sensor data 202, drive attributes 204, failure rate profiles 206, and preset attribute thresholds 208 is performed by drive replacement logic 210. Once failure for a disk drive in disk drives 102 is predicted drive control 212 indicates that the disk drive should be replaced. The indication can be external in the form of an LED or LCD that indicates which drive is failing. Further, the indication can be in the form of a message on a monitor that is connected to CPU 104. The message can also include information regarding the location of the disk drive and the reason for the prediction of the failure. Various other ways of indicating disk drive failure are also possible. The manner in which this indication is provided does not restrict the scope of this invention. Drive control 212 further ensures that data is reconstructed or copied into a replacement disk drive and further data is directed to the replacement disk drive.

Figure 3:
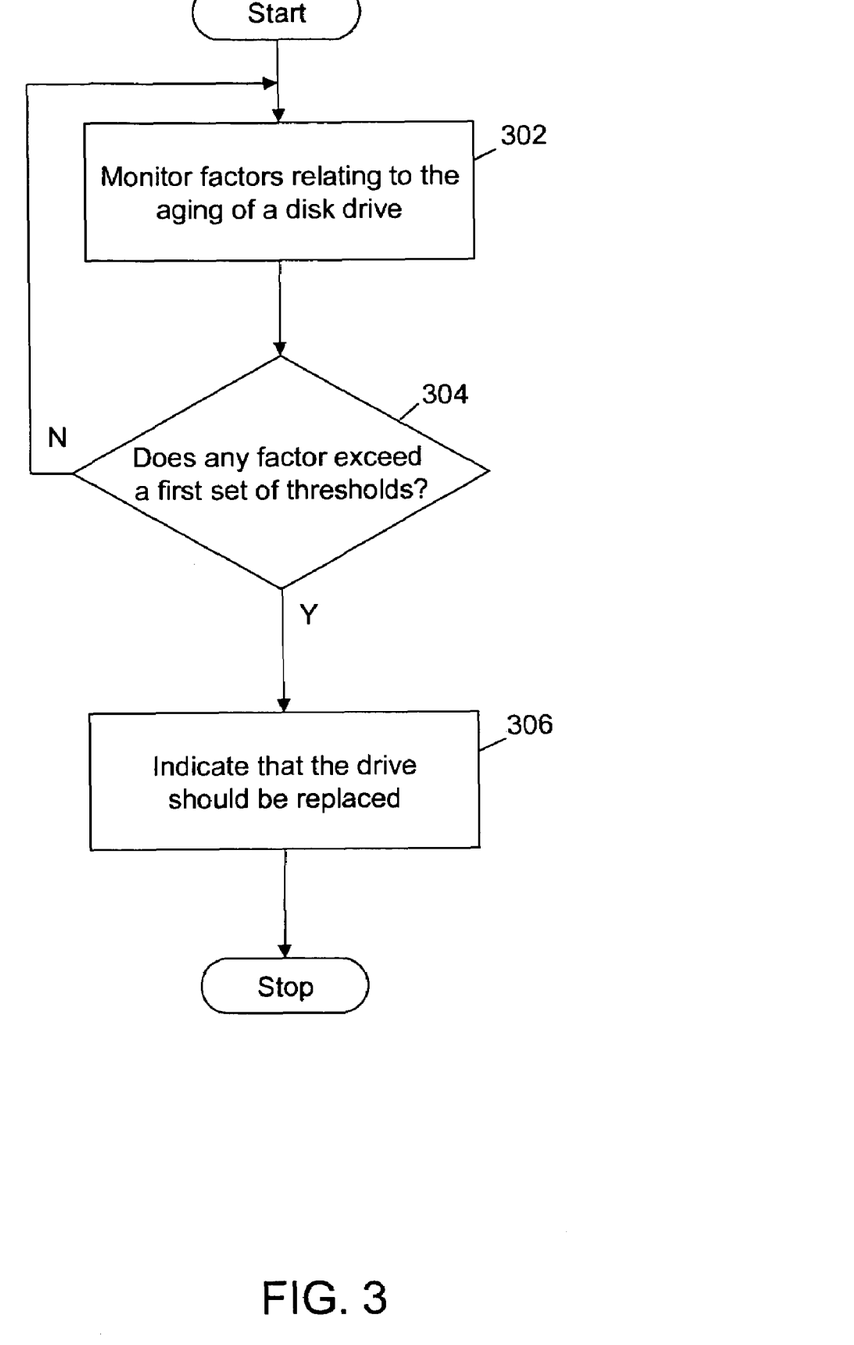
FIG. 3 is a flowchart of a method for preventing the failure of disk drives in a storage system, in accordance with one embodiment of the present invention.

FIG. 3 is a flowchart of a method for preventing the failure of disk drives in storage system 100, in accordance with one embodiment of the present invention. At step 302, factors relating to the aging of each of disk drives 102 are monitored. At step 304, it is determined if any of the factors exceed a first set of thresholds. If the thresholds are not exceeded, the method returns to step 302 and this process is repeated. In case the thresholds are exceeded, an indication for the replacement of the disk drive, for which the factor has exceeded the threshold, is given at step 306. Factors that are related to aging include power-on hours (POH) and start stops (SS). POH is the sum total of the number of hours for which a particular disk drive has been powered on. To predict disk drive failure, POH is compared to a preset percentage of the mean-time-to-failure (MTTF) of disk drives 102. This can be calculated by storage system 100 as disk drives fail. In another embodiment of the present invention, MTTF is calculated based on the temperature of disk drives 102. MTTF depends on the temperature at which a disk drive operates. MTTF versus temperature graphs can be obtained from manufacturers of disk drives.

Figure 4:
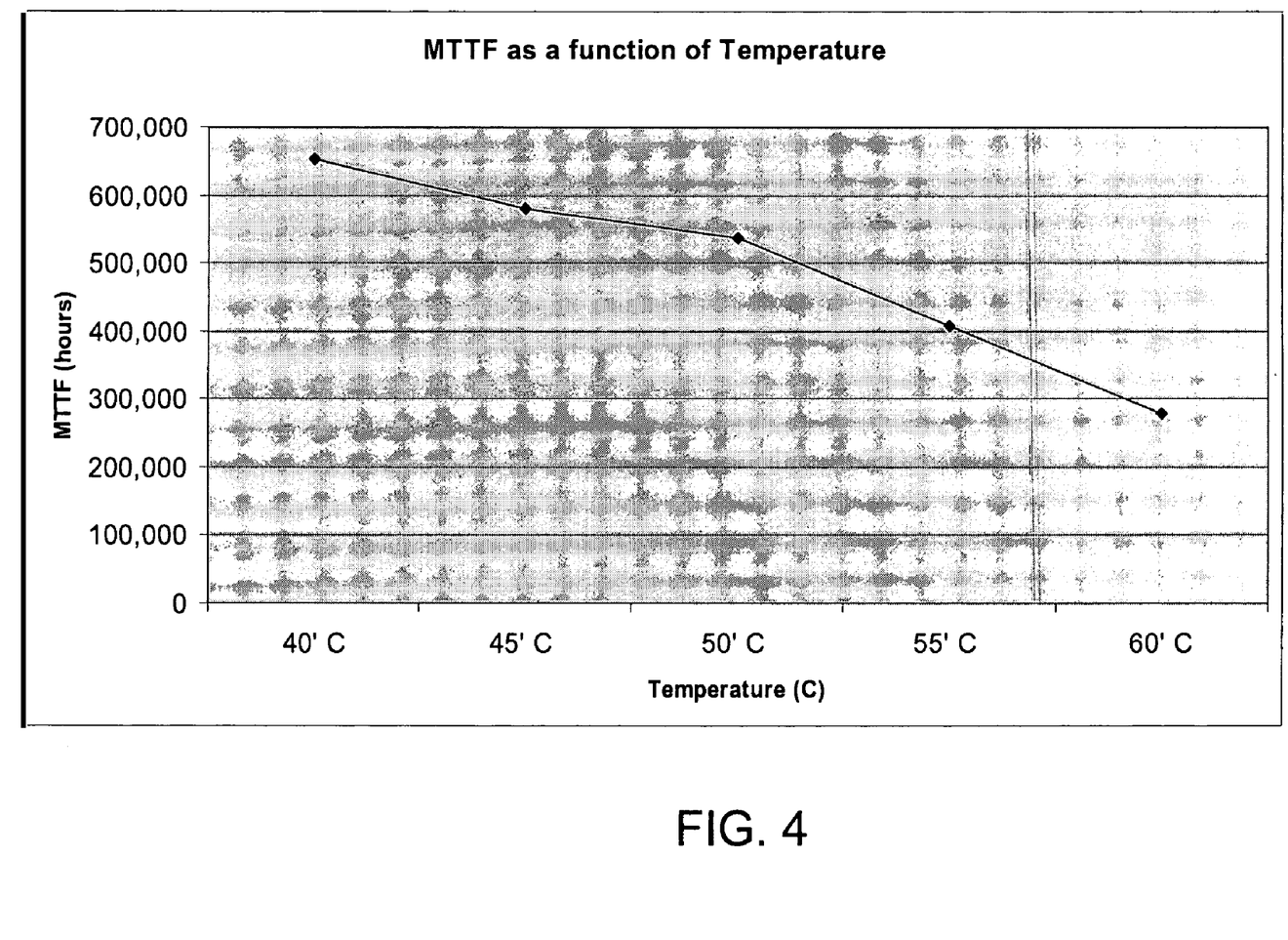
FIG. 4 is a graph showing an exemplary variation of mean-time-to-failure of a disk drive with temperature.

FIG. 4 is a graph showing an exemplary variation of MTTF with temperature. The graph shown is applicable for disk drives manufactured by one specific disk vendor. Similar graphs are provided by other disk drive manufacturers. These graphs can be piecewise graphs as shown in FIG. 4 or linear graphs. This depends on the experimentation conducted by the disk drive manufacturer. In accordance with another embodiment of the present invention, MTTF versus temperature graphs are stored as vector pairs of MTTF values and temperatures. These vector pairs are stored as failure rate profiles 206 in memory 106. For temperatures between the values stored in vector pairs, MTTF values are calculated by interpolation between consecutive vector pairs. The preset percentage for comparing the MTTF with the power-on hours of each of disk drives 102 can be chosen between 0 and 0.2 (exclusive). Other percentages can be used. For example, one basis for choosing a percentage can be based on studies that have shown that useful life is smaller than that indicated by manufacturers' MTTF.

Therefore, an indication for replacement is given when:

$$POH > p*MTTF(T)$$

where, p=preset percentage for POH, 0<p<0.2, and
MTTF(T)=mean-time-to-failure calculated on the basis of temperature.

Start stops (SS) is the sum total of the number of times a disk drive completes a cycle of power on, disk drive usage and power off. To predict disk drive failure, SS is compared to a preset percentage of the maximum allowable value for the SS. This value is specified by drive manufacturers. Most drive manufacturers recommend the maximum allowable value for SS to be 50,000. The preset percentage for comparing the maximum allowable value of SS with the measured SS of each of disk drives 102 can be chosen between 0 and 0.7 (exclusive). Therefore, an indication for replacement of a disk drive is given when:

$$SS > c*SS_{max}$$

where, r=preset percentage for SS, 0<c<0.7, and
$SS_{max}$=maximum allowable value for SS≈50,000

Figure 5:
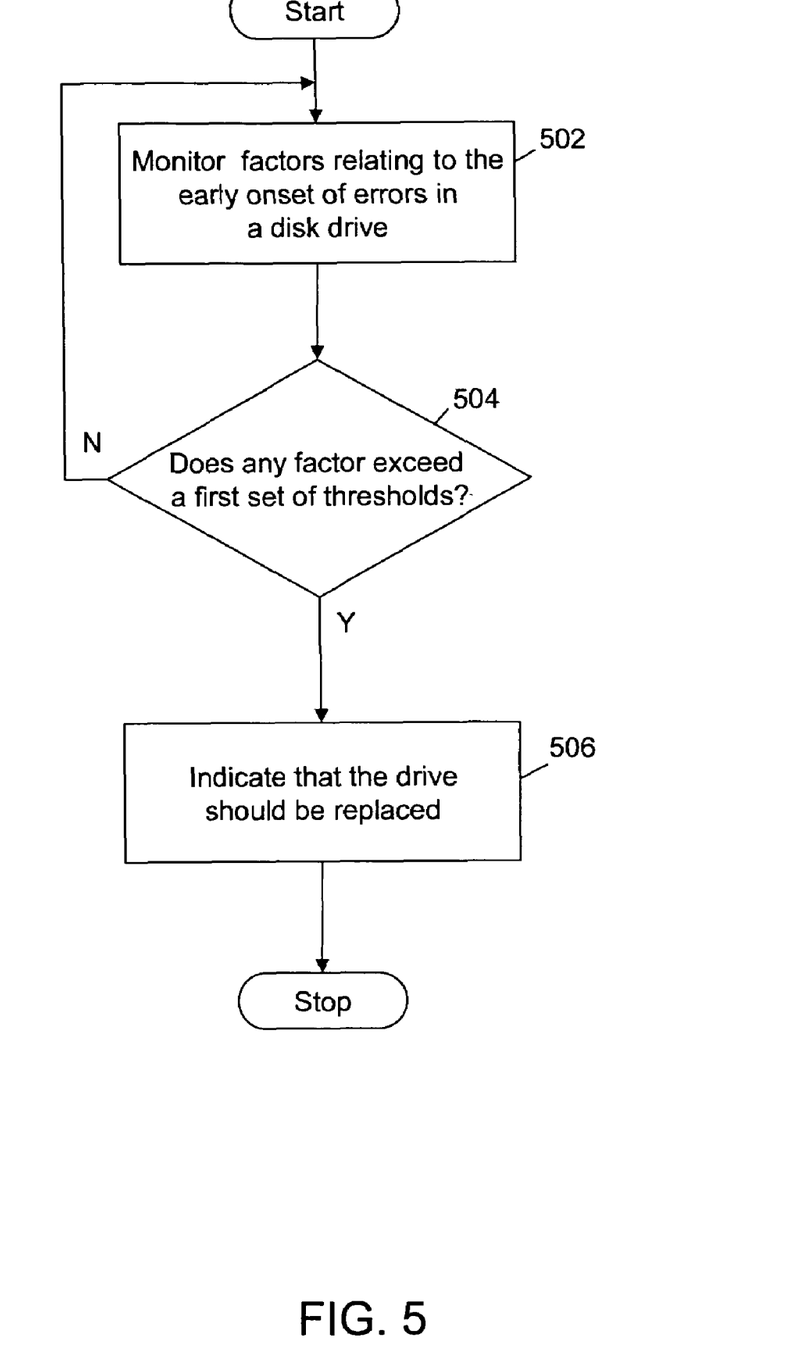
FIG. 5 is a flowchart of a method for preventing the failure of disk drives in a storage system, in accordance with another embodiment of the present invention.

FIG. 5 is a flowchart of a method for preventing the failure of disk drives in storage system 100, in accordance with another embodiment of the present invention. At step 502, factors relating to the early onset of errors in each of disk drives 102 are monitored. At step 504, it is determined if any of the factors exceed a first set of thresholds. If the thresholds are not exceeded, the method returns to step 502 and this process is repeated. In case any of the set of thresholds is exceeded, an indication for the replacement of the disk drive is given at step 506. Factors that are related to the early onset of errors include reallocated sector count (RSC), read error rate (RSE), seek error rate (SKE), spin retry count (SRC). RSC is defined as the number of spare sectors that have been reallocated. Data is stored in disk drives 102 in sectors. Disk drives 102 also include spare sectors to which data is not written. When a sector goes bad, i.e., data cannot be read or written from the sector, disk drives 102 reallocate spare sectors to store further data. In order to predict disk drive failure, RSC is compared to a preset percentage of the maximum allowable value for the RSC. This value is specified by the disk drive manufacturers. Most disk drive manufacturers recommend the maximum allowable value for RSC to be 1,500. The preset percentage for comparing the maximum allowable value of RSC with the measured RSC can be chosen between 0 and 0.7 (exclusive). Therefore, an indication for replacement is given when:

$$RSC > r*RSC_{max}$$

where, r=preset percentage for RSC, 0<r<0.7, and
$RSC_{max}$=maximum allowable value for RSC≈1,500

Read error rate (RSE) is the rate at which errors in reading data from disk drives occur. Read errors occur when a disk drive is unable to read data from a sector in the disk drive. In order to predict disk drive failure, RSE is compared to a preset percentage of the maximum allowable value for the RSE. This value is specified by disk drive manufacturers. Most disk drive manufacturers recommend the maximum allowable value for RSE to be one error in every 1024 sector read attempts. The preset percentage for comparing the maximum allowable value of RSE with the measured RSE of each of disk drives 102 can be chosen between 0 and 0.7 (exclusive). Therefore, an indication for replacement is given when:

$$RSE > m*RSE_{max}$$

where, m=preset percentage for RSE, 0<m<0.7, and
$RSE_{max}$=maximum allowable value for RSE≈1 read error/1024 sector read attempts Seek error rate (SKE) is the rate at which errors in seeking data from disk drives 102 occur. Seek errors occur when a disk drive is not able to locate where particular data is stored on the disk drive. To predict disk drive failure, SKE is compared to a preset percentage of the maximum allowable value for the SKE. This value is specified by disk drive manufacturers. Most disk drive manufacturers recommend the maximum allowable value for SKE to be one seek error in every 256 sector seek attempts. The preset percentage for comparing the maximum allowable value of SKE with the measured SKE of each of disk drives 102 can be chosen between 0 and 0.7 (exclusive). Therefore, an indication for replacement is given when:

$$SKE > s*SKE_{max}$$

where, s=preset percentage for RSE, 0<s<0.7, and
$SKE_{max}$=maximum allowable value for SKE≈1 seek error/256 sector seek attempts Spin retry count (SRC) is defined as the number of attempts it takes to start the spinning of a disk drive. To predict disk drive failure, SRC is compared to a preset percentage of the maximum allowable value for the SRC. This value is specified by disk drive manufacturers. Most disk drive manufacturers recommend the maximum allowable value for SRC to be one spin failure in every 100 attempts. The preset percentage for comparing the maximum allowable value of SRC with the measured SRC of each of disk drives 102 can be chosen between 0 and 0.3 (exclusive). Therefore, an indication for replacement is given when:

$$SRC > t*SRC_{max}$$

where, t=preset percentage for SRC, 0<t<0.3, and
$SRC_{max}$=maximum allowable value for SRC≈1 spin failure/100 attempts.

Figure 6:
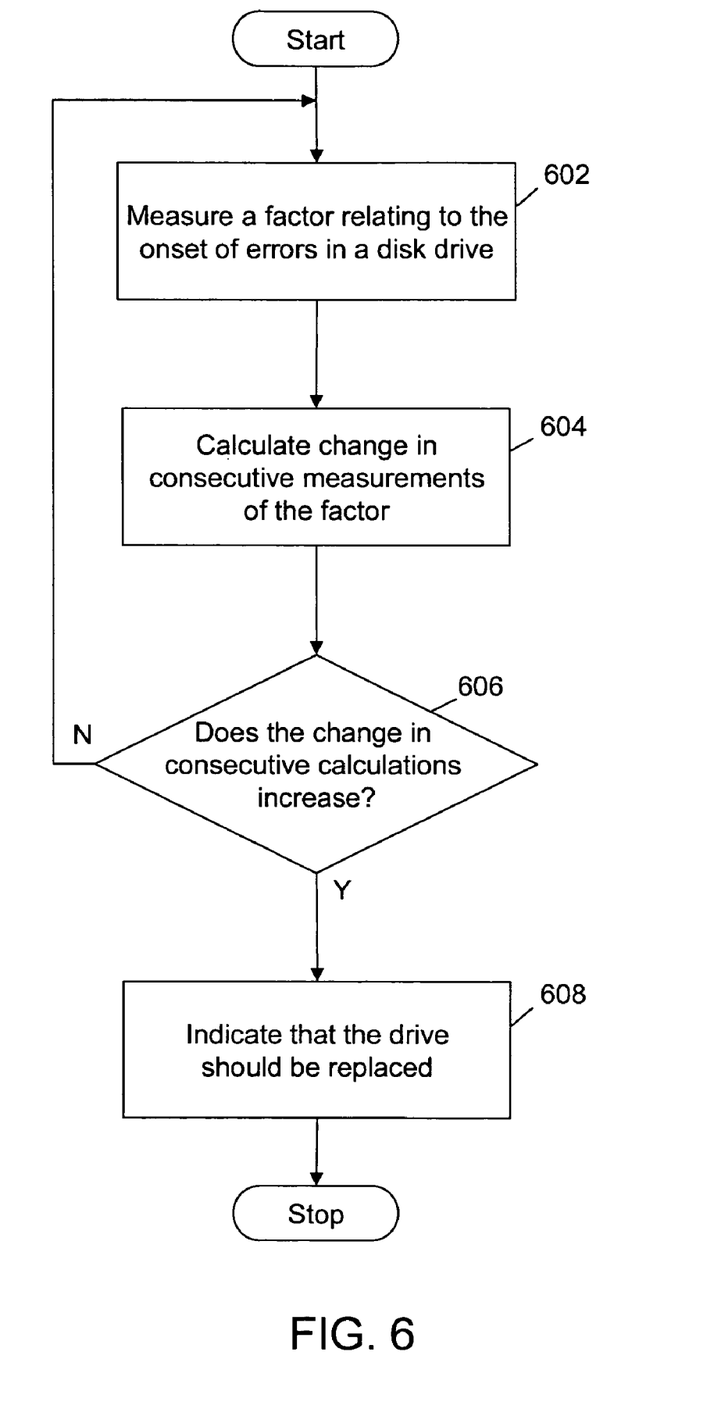
FIG. 6 is a flowchart of a method for preventing the failure of disk drives in a storage system, in accordance with another embodiment of the present invention.

FIG. 6 is a flowchart of a method for preventing the failure of disk drives in storage system 100, in accordance with another embodiment of the present invention. At step 602, a factor relating to the onset of errors in each of disk drives 102 is measured. At step 604, changes in the value of the factor are calculated. At step 606, it is determined that the changes in the factor increase in consecutive calculations. If the thresholds are not exceeded, the method returns to step 602 and the process is repeated. In case, the change increases, an indication is given that the disk drive should be replaced at step 608. An increase in change in two consecutive calculations of the change indicates that errors within the disk drive are increasing and could lead to failure of the disk drive. In one embodiment of the present invention, reallocated sector count (RSC) is considered as a factor relating to the onset of errors. Therefore, an indication for drive replacement is given when:

$$RSC(i+2)-RSC(i+1)>RSC(i+1)-RSC(i) \text{ AND}$$

$$RSC(i+3)-RSC(i+2)>RSC(i+2)-RSC(i+1) \text{ for any } i$$

where, i=a serial number representing measurements

Other factors can be used. For example, spin retry count (SRC), seek errors (SKE), read soft error (RSE), recalibrate retry (RRT), read channel errors such as a Viterbi detector mean-square error (MSE), etc., can be used. As future factors become known they can be similarly included.

Thresholds for comparing the factors are obtained from manufacturers of disk drives. In one embodiment of the present invention, memory 106 stores thresholds specific to disk drive manufacturers. These thresholds and their corresponding threshold percentages are stored in memory 106 as preset attribute thresholds 208. This is useful in case plurality of disk drives 102 comprises disk drives obtained from different disk drive manufacturers. In this embodiment, factors obtained from a particular disk drive are compared with thresholds recommended by the manufacturer of the particular disk drive as well as empirical evidence gathered during testing of the drives.

Combinations of the factors discussed above can also be used for predicting the failure of disk drives. When combinations of factors are monitored, they are compared with the corresponding thresholds that are stored in memory 106. Further, environmental data obtained from environmental sensors 110 can also be used, in combination with the described factors, to predict the failure of disk drives. For example, in case the temperature of a disk drive exceeds a threshold value, an indication for replacement of the disk drive can be given.

The invention, as described above can also be used to prevent the failure of disk drives in power-managed RAID systems where not all disk drives need to be powered on simultaneously. The power-managed scheme has been described in the co-pending U.S. patent application 'Method and Apparatus for Power Efficient High-Capacity Storage System' referenced above. In this scheme, sequential writing onto disk drives is implemented, unlike simultaneous writing as performed in RAID 5 scheme. Sequential writing onto disk drives saves power because it requires powering up of one disk drive at a time.

Although the invention has been described with respect to specific embodiments thereof, these embodiments are descriptive, and not restrictive, of the invention. For example, it should be apparent that the specific values and ranges of parameters can vary from those described herein. Values for the threshold parameters p, c, r, m, s, t, etc., can change as new experimental data becomes known, as preferences or overall system characteristics change, or to achieve improved or desirable performance.

Although terms such as "storage device," "disk drive," etc., are used, any type of storage unit can be adaptable to work with the present invention. For example, disk drives, tape drives, random access memory (RAM), etc., can be used. Different present and future storage technologies can be used such as those created with magnetic, solid-state, optical, bioelectric, nano-engineered, or other techniques.

Storage units can be located either internally inside a computer or outside a computer in a separate housing that is connected to the computer. Storage units, controllers and other components of systems discussed herein can be included at a single location or separated at different locations. Such components can be interconnected by any suitable means such as with networks, communication links or other technology. Although specific functionality may be discussed as operating at, or residing in or with, specific places and times, in general the functionality can be provided at different locations and times. For example, functionality such as data protection steps can be provided at different tiers of a hierarchical controller. Any type of RAID or RAIV arrangement or configuration can be used.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "processor" or "process" includes any human, hardware and/or software system, mechanism, or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Moreover, certain portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. In addition, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes, and substitutions are intended in the foregoing disclosures. It will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for disk drive replacement in a power-managed RAID storage system having a plurality of disk drives that are powered-on at a time before data access and are otherwise powered-off, the method comprising:
   monitoring a factor relating to powering-on a particular disk drive in the plurality of disk drives;
   determining a manufacturer threshold for replacement of the particular disk drive, the manufacturer threshold specified by a manufacturer of the particular disk drive for the factor;
   determining a percentage threshold less than the manufacturer threshold specified by the manufacturer;
   predicting a time at which the particular disk drive will fail based on the percentage threshold as applied to the factor and based on a power management characteristic of the particular disk drive;
   powering on a replacement disk drive if it is powered off; and
   transferring data from the particular disk drive to the replacement disk drive if the predicted time is below the percentage threshold before failure of the particular disk drive; and
   using the replacement disk drive in place of the particular disk drive.

2. The method of claim 1, wherein the factors include power-on hours.

3. The method of claim 1, wherein the percentage threshold is derived from the mean-time-to-failure of the particular disk drive.

4. The method of claim 3, wherein the mean-time-to-failure is derived from a function of temperature measurement.

5. The method of claim 1, wherein the factors include start stops.

6. The method of claim 1, wherein the power management characteristic includes a predicted frequency of start stops.

7. The method of claim 1, wherein the power management characteristic includes a measured frequency of start stops.

8. The method of claim 1, wherein the power management characteristic includes a predicted frequency of power-on/off cycles.

9. The method of claim 1, wherein the power management characteristic includes a measured frequency of power-on/off cycles.

10. The method of claim 1, further comprising:
    monitoring changes in a value for the factor; and
    determining, after two or more consecutive calculations, that the particular drive should be replaced if the change in value for the factor increases.

11. The computer readable medium of claim 10, wherein the one or more instructions further comprise:
    monitoring changes in a value for the factor; and
    determining, after two or more consecutive calculations, that the particular drive should be replaced if the change in value for the factor increases.

12. An apparatus for disk drive replacement in a power-managed RAID storage system having a plurality of disk drives that are powered-on at a time before data access and are otherwise powered-off, the apparatus comprising:
    a processor:
    a machine-readable storage medium including instructions executable by the processor for:
    monitoring a factor relating to powering-on a particular disk drive in the plurality of disk drives;
    determining a manufacturer threshold for replacement of the particular disk drive, the manufacturer threshold specified by a manufacturer of the particular disk drive for the factor;
    determining a percentage threshold less than the manufacturer threshold specified by the manufacturer;
    predicting a time at which the particular disk drive will fail based on the percentage threshold as applied to the factor and based on a power management characteristic of the particular disk drive;
    powering on a replacement disk drive if it is powered off; and
    transferring data from the particular disk drive to a replacement disk drive if the predicted time is below the threshold before failure of the particular disk drive; and
    using the replacement disk drive in place of the particular disk drive.

13. A machine-readable storage medium including instructions executable by a processor for preventing disk drive failures in a power-managed RAID storage system having a plurality of disk drives that are powered-on at a time before data access and are otherwise powered-off, the machine-readable storage medium comprising one or more instructions for:

monitoring a factor relating to powering-on a particular disk drive in the plurality of disk drives;

determining a manufacturer threshold for replacement of the particular disk drive, the manufacturer threshold specified by a manufacturer of the particular disk drive for the factor;

determining a percentage threshold less than the manufacturer threshold specified by the manufacturer;

predicting a time at which the particular disk drive will fail based on the percentage threshold as applied to the factor and based on a power management characteristic of the particular disk drive;

powering on a replacement disk drive if it is powered off; and     transferring data from the particular disk drive to a replacement disk drive if the predicted time is below at least one threshold before failure of the particular disk drive; and     using the replacement disk drive in place of the particular disk drive.

14. The apparatus of claim 13, wherein instructions are further executable by the processor for:

monitoring changes in a value for the factor; and determining, after two or more consecutive calculations, that the particular drive should be replaced if the change in value for the factor increases.

15. The apparatus of claim 13, wherein the factors include power-on hours.

16. The apparatus of claim 13, wherein the percentage threshold is derived from the mean-time-to-failure of the particular disk drive.

17. The apparatus of claim 16, wherein the mean-time-to-failure is derived from a function of temperature measurement.

18. The apparatus of claim 13, wherein the factors include start stops.

19. The apparatus of claim 13, wherein the power management characteristic includes a predicted frequency of start stops.

20. The apparatus of claim 13, wherein the power management characteristic includes a measured frequency of start stops.

21. The apparatus of claim 13, wherein the power management characteristic includes a predicted frequency of power-on/off cycles.

22. The apparatus of claim 13, wherein the power management characteristic includes a measured frequency of power-on/off cycles.

* * * * *